United States Patent [19]

Birkenbach

[11] 4,391,335
[45] Jul. 5, 1983

[54] ROTARY HOE WHEEL

[75] Inventor: Eugen J. Birkenbach, Kildeer, Ill.

[73] Assignee: International Harvester Co., Chicago, Ill.

[21] Appl. No.: 230,979

[22] Filed: Feb. 2, 1981

[51] Int. Cl.³ .................................................. A01B 21/04
[52] U.S. Cl. .................................. 172/540; 172/556
[58] Field of Search ............... 172/556, 548, 123, 540, 172/120, 123, 572, 573, 542, 543, 549, 550, 555, 554; 37/189

[56] References Cited

U.S. PATENT DOCUMENTS

| | | | |
|---|---|---|---|
| 1,690,252 | 11/1928 | Schumacher | 172/548 |
| 1,703,539 | 2/1929 | Ohlsen | 172/548 |
| 1,844,255 | 2/1932 | Kaupke | 172/556 X |
| 1,884,720 | 10/1932 | Karl | 172/548 |
| 2,560,359 | 7/1951 | McCardell | 172/556 |
| 2,596,527 | 5/1952 | Bushong | 172/555 |
| 2,597,742 | 5/1952 | Mahoney | 172/556 |
| 3,065,804 | 11/1962 | Morkoski | 172/540 |

Primary Examiner—Richard J. Johnson
Attorney, Agent, or Firm—Dennis K. Sullivan; F. David AuBuchon

[57] ABSTRACT

A wheel that has an alternating tooth structure for improved entry into the soil and movement therethrough for efficient soil lifting and flow, self cleaning and balanced operation. The wheel includes a central hub, four equally spaced spokes extending radially therefrom to a circular flange from which radially extending rearwardly curved, from the direction of travel, teeth extend to work the soil. A tooth of the teeth has a rearward surface that is tapered from one lateral surface to the other and rearwardly to move the soil to one side of the wheel and the adjacent tooth has a rearward surface that is similarly but, oppositely tapered but also rearwardly, to move the soil to the other side of the wheel with the teeth alternating in this sequence around the circumference of the flange.

8 Claims, 6 Drawing Figures

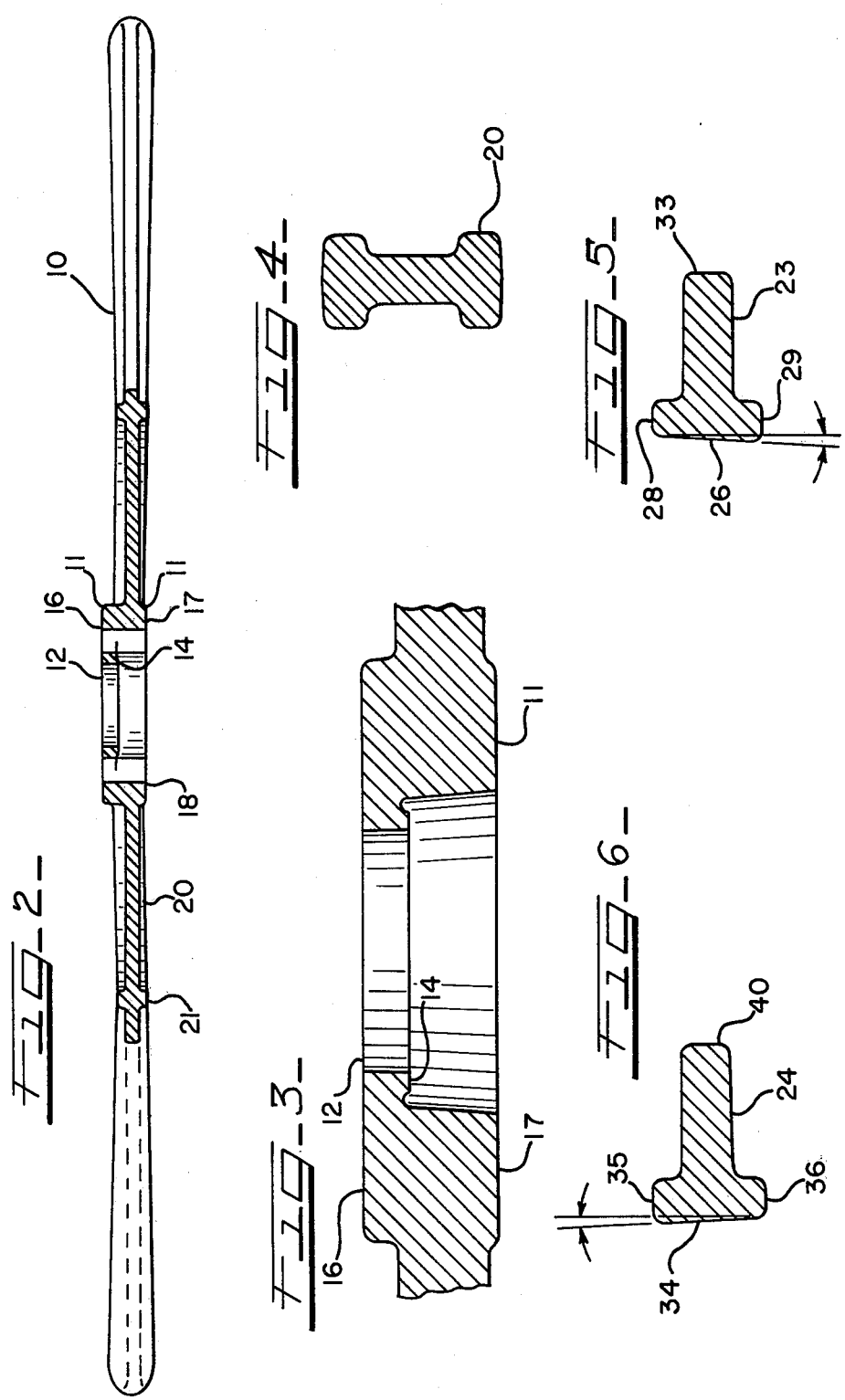

ROTARY HOE WHEEL

BACKGROUND OF THE INVENTION

1. Field of the Invention

This invention pertains generally to agricultural implements and particularly to a soil working wheel of the rotary hoe type.

2. Description of the Prior Art

Current rotary hoes consist of a plurality of laterally spaced rotary hoe wheels mounted on a tool bar by alternating long and short and pivotally mounted support arms to form two longitudinally spaced rows. Each arm is individually biased toward the soil for the wheel to follow the ground contour. Two rows are used to primarily prevent the carrying of trash along with the hoe. Each wheel has a plurality of radially extending rearwardly curved teeth which are designed to enter the soil, essentially vertically for quick penetration and to break the crust, and move the soil rearwardly along with uprooted weeds. Each wheel is free to rotate independently of the other. The hoeing operation can be accomplished at high speed with large spans being covered of various type crops.

Most commonly each hoe wheel is entirely made of steel with a central hub and the individual teeth radiating from the hub with a circular flange fixed to each tooth on both lateral sides thereof and midway between the tooth end that works the soil and the hub. Other wheels dispense with the flanges and rivet adjacent teeth to each other in this area for wider soil coverage. The tooth end that works the soil may be spoon shaped with the concave portion facing rearwardly or merely with an edge transverse to the line of travel if of cast construction.

The fabricated steel hoe wheel requires considerable elements all of which are usually riveted together which makes fabrication expensive. Also the spoon shaped tooth end is not necessarily the most efficient configuration for tooth entry into the soil, movement through the soil, and the resulting soil flow. Cast wheels require fewer parts but the normally transverse hoeing surface also does not produce an efficient soil flow. Thus the design of this widely used, but simple implement with its plurality of identical soil working elements, can be improved.

SUMMARY OF THE INVENTION

Applicant, as a consequence, designed a rotary hoe wheel that largely avoids the problems of the prior art. Preferably, the wheel is made of cast nodular iron for minimal machining. Specifically, Applicant provides a particular alternating tooth configuration for improved entry into the soil and movement therethrough, soil lifting and flow, self cleaning, and smooth balanced operation. The cast structure eliminates the large number of fabricated steel items which contributes to the wheel cost and the possibility of faulty construction.

The wheel preferably has a central hub structure that can be used with antifriction bearings as shown or without by increasing the lateral dimensions. Four equally spaced spokes extend radially outward from the hub and support the circular flange from which the radially extending, rearwardly curved, from the direction of travel when towed, equally spaced teeth extend with the other ends adapted to work the soil. A tooth of said teeth has a rearward surface that is tapered generally from one lateral surface of the tooth to the other and rearwardly to lift and move soil to one side of the wheel and the adjacent tooth has a rearward surface that is similarly but oppositely tapered but also rearwardly to lift and move soil to the other side of the wheel with the teeth alternating in this sequence around the circumference of the flange. Each tooth in the area of the end of the taper and the lateral surface forms a soil cutting area that initially enters the soil followed by the balance of the cutting area that extends therefrom forwardly to the other lateral edge for efficient wedge or plow-like movement through the soil while directing the soil flow as noted. This tapered rear surface also is self cleaning as compared to the spoon type surface which has the tendency to retain especially moist soil. Each tooth also has a forwardly extending central web between the lateral surfaces and extending from the flange and tapered toward the end of the tooth for strength to this cantilever beam structure. Also the web merges with the rearward surface to form an edge that is self sharpening in its vertical entry into the soil. Each tooth's two lateral surfaces are preferably tapered outwardly from the flange to cover a greater area of soil with each lateral surface extending equal lateral distances from the tooth center. For a balanced hoe wheel, the centers of the alternating teeth all lie in a single plane and of course, since the teeth alternate, the soil load resulting from movement through the soil is also balanced for efficient bearing performance regardless if antifriction bearings are used or not.

It is, therefore, an object of this invention to provide a new and improved rotary hoe wheel.

Another object of this invention is to provide an improved hoe tooth configuration for improved movement through the soil and efficient soil flow.

Another object of this invention is to provide an improved hoe tooth configuration for balanced hoe wheel operation.

BRIEF DESCRIPTION OF THE DRAWINGS

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1; and

FIG. 6 is a sectional view taken along line 6—6 of FIG. 1.

DESCRIPTION OF THE PREFERRED EMBODIMENT

Figure 1:
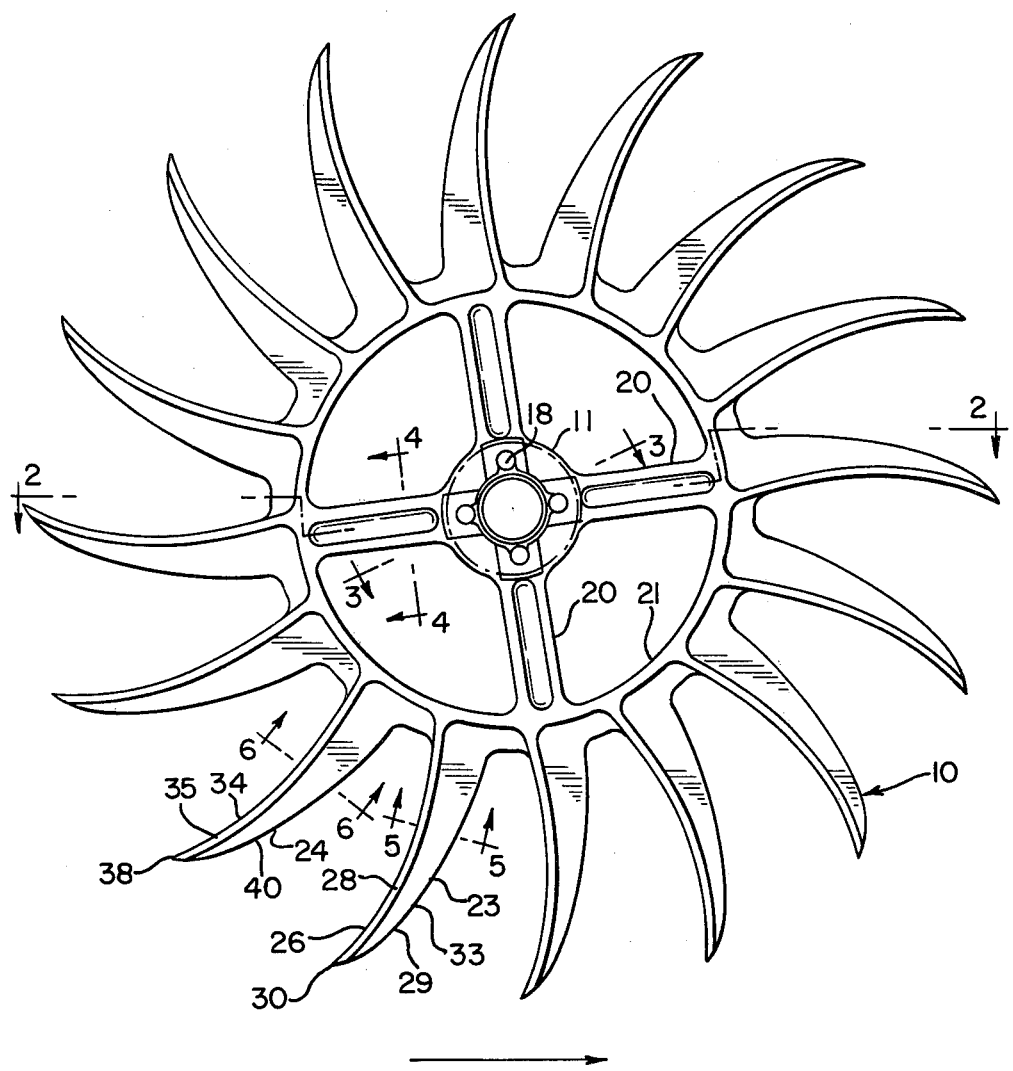
FIG. 1 is a side elevational view of the rotary hoe wheel of this invention.

Referring to FIG. 1, 10 indicates the rotary hoe wheel of this invention. Wheel 10 is intended to be supported from the toolbar of a tractor and to be drawn across the soil in the direction of the arrow shown in FIG. 1. Wheel 10 is preferably made of cast nodular iron and includes central hub 11. Hub 11, as also shown in FIGS. 2 and 3, is adapted for use with anti-friction bearings. Aperture 12 is provided for a shaft to be rigidly connected to the inner race of a bearing. The shaft would also support the wheel. Shoulder 14 is provided for the support of the outer race of the bearing which would occupy the space between surfaces 16 and 17 of the hub and extend therefrom. A suitable retainer fastened to surface 17 via bolts and nuts extending through holes 18 would press the bearing outer race against shoulder 14 would ensure rotation of the outer race and the hub and thus wheel about the rigid support shaft. Should non-antifriction bearing use be desired shoulder 14 could be extended to at least surface 17 and opening 12 sized for pivotal movement on the noted shaft and might also serve as a spacer in a conventional mounting. Holes 18 would not then be necessary.

Extending from hub 11 are spaced spokes 20 which are shown in detail in FIG. 4. Spokes 20 provide support for preferably circular flange 21. Flange 21 provides support for the radially extending equally spaced 16 teeth shown. Tooth 23 is also shown in detail in FIG. 5 and tooth 24 in FIG. 6. The teeth 23 and 24 alternate around the circumference of the flange.

Tooth 23 is rearwardly curving from the intended direction of travel as shown by the arrow in FIG. 1. Tooth 23 has rearward surface 26 and has lateral surfaces 28 and 29. Surface 26 all along its length to the soil working end 30 is tapered rearwardly as shown in FIG. 5 from generally surface 28 to surface 29. The taper is preferably 3° or more. The edge of surface 29 and surface 26 form a cutting area that leads the balance of forwardly tapered surface 26 to surface 28 through the soil in a wedge or plow-like action. Surface 26 also directs all of the soil in the direction of surface 28. Reinforcing tooth 23 is web 33. Web 33 extends the length of the tooth from end 30, to flange 21 and tapers toward the end for a strong cantilever beam construction. At the end 30, the web merges therewith for a self-sharpening soil penetrating edge for essentially vertical entry into the soil as shown in the next forward tooth. Also from FIG. 2, it is noted that comparable surfaces 28 and 29 taper laterally outward from flange 21 to provide a rounded but broad end for a substantial amount of soil movement. As shown in FIGS. 2 and 5 the tooth 23 and web 35 are symmetric about the center of the tooth.

Adjacent tooth 24, is similar to tooth 23 in its structure. Specifically, however, rearwardly curving tooth 24 has rearward surface 34 and lateral surfaces 35 and 36. Surface 34 all along its length to the soil working end 38 is tapered rearwardly as shown in FIG. 6 from surface 36 rearwardly to surface 35. Here too, the taper is preferably the same as that for tooth 23 for a balanced condition and preferably 3° or more. The edge of surface 35 and surface 34 form a cutting area that leads the balance of the forwardly tapered surface 34 to surface 36 through the soil in a wedge like action similar to tooth 23 and moves the soil oppositely toward surface 36. Due to the rearward curve of teeth 23 and 24, the soil is also lifted along with weeds and the tapered surface aids in cleaning soil from end 30 to flange 21 and tapers toward the end. Web 40 also merges with end 38 for a similar action as tooth 23. Surfaces 35 and 36, as shown in FIG. 2, also taper laterally outward from flange 21 to provide a rounded, but broad end. And, as with tooth 23, tooth 24 and web 40 extend equal distance from the center of the tooth. As noted also in FIG. 2, each tooth type 23 or 24 which alternate around the circumference of the wheel 10, also have their centers lying in the same plane for a symmetric structure in regard to tooth applied loads.

In view of the above description, it is believed that the operation of the hoe wheel of this invention is readily apparent as well as the advantages from the construction detailed.

What is claimed is:

1. A rotary hoe wheel adapted to be drawn over the soil and comprising a hub adapted to be rotationally connected to a supporting member, a plurality of spokes extending radially from said hub, a generally circular flange connected to said spokes outward of said hub and a plurality of radially extending rearwardly curved to the direction of travel teeth connected to said flange and extending to a distal end adapted to work the soil, a tooth of said plurality having a rearward surface that is tapered at substantially 3° generally from one lateral surface rearwardly to the other from said distal end radially inwardly for the entire soil working portion of said tooth to engage, lift and move soil to one side of the wheel but rearwardly and the adjacent tooth rearward surface similarly and oppositely tapered at substantially 3° but also rearwardly to similarly move soil to the other side of the wheel but rearwardly with the teeth alternating in this sequence around the flange.

2. The hoe wheel of claim 1 in which the lateral edge and rearward surface of each tooth at the end of the rearward taper form a cutting area that extends therefrom forwardly to the other lateral edge to aid in tooth movement through the soil.

3. The hoe wheel of claim 2 in which each tooth has a forwardly extending central web between said lateral surfaces and extending from the flange and tapered toward the end of the tooth.

4. The hoe wheel of claim 3 in which the web and the end of each tooth also merge to form a cutting surface for essentially vertical entry into the soil.

5. The hoe wheel of claim 4 in which each lateral surface of each tooth is tapered outwardly from said flange.

6. The hoe wheel of claim 5 in which each lateral surface of each tooth is equally disposed from the center of each tooth.

7. The hoe wheel of claim 6 in which the center of all teeth lie in substantially a single plane.

8. The hoe wheel of claim 7 in which all teeth are equally spaced along the circumference of the flange and the spokes are equally spaced along the circumference of the hub.

* * * * *